(12) United States Patent
 Zhong

(10) Patent No.: US 10,505,182 B2
(45) Date of Patent: Dec. 10, 2019

(54) LITHIUM ATTACHED ELECTRODES AND METHOD OF MAKING SAME

(71) Applicant: Linda Zhong, Oakland, CA (US)

(72) Inventor: Linda Zhong, Oakland, CA (US)

(73) Assignee: LICAP TECHNOLOGIES, INC., Sacramento, CA (US)

( * ) Notice: Subject to any disclaimer, the term of this patent is extended or adjusted under 35 U.S.C. 154(b) by 72 days.

(21) Appl. No.: 15/638,140

(22) Filed: Jun. 29, 2017

(65) Prior Publication Data

US 2018/0013139 A1 Jan. 11, 2018

Related U.S. Application Data

(60) Provisional application No. 62/359,031, filed on Jul. 6, 2016.

(51) Int. Cl.
| | |
|---|---|
| *H01M 4/38* | (2006.01) |
| *H01M 10/0525* | (2010.01) |
| *H01G 11/50* | (2013.01) |
| *H01M 4/139* | (2010.01) |
| *H01M 4/13* | (2010.01) |

(Continued)

(52) U.S. Cl.
CPC ............ *H01M 4/382* (2013.01); *H01G 11/06* (2013.01); *H01G 11/26* (2013.01); *H01G 11/28* (2013.01); *H01G 11/50* (2013.01); *H01G 11/86* (2013.01); *H01M 4/13* (2013.01); *H01M 4/139* (2013.01); *H01M 10/0525* (2013.01); *H01G 11/24* (2013.01); *H01M 4/621* (2013.01);

(Continued)

(58) Field of Classification Search
CPC ........ H01M 4/382; H01M 4/13; H01M 4/139; H01M 10/0525; H01G 11/24; H01G 11/50
USPC ...................................... 429/231.95
See application file for complete search history.

(56) References Cited

U.S. PATENT DOCUMENTS

| | | | | |
|---|---|---|---|---|
| 6,001,139 A | * | 12/1999 | Asanuma | ................ H01M 4/13 |
| | | | | 29/623.3 |
| 2006/0093871 A1 | * | 5/2006 | Howard | ................ H01M 4/131 |
| | | | | 429/9 |

(Continued)

FOREIGN PATENT DOCUMENTS

| | | | | |
|---|---|---|---|---|
| JP | 2008060130 A | * | 3/2008 | |
| JP | 2008305928 A | * | 12/2008 | |

(Continued)

OTHER PUBLICATIONS

Ueki, Shinichi, Machine Translation of JP-2008060130-A, Mar. 2008 (Year: 2008).*

(Continued)

*Primary Examiner* — Sean P Cullen
(74) *Attorney, Agent, or Firm* — Stetina Brunda Garred and Brucker; Mark B. Garred

(57) ABSTRACT

A method for fabricating an electrode includes: determining a thickness of an active layer; selecting lithium (Li) foil having a specified thickness; determining widths of one or more Li strips based on an active layer to Li layer weight ratio or volume ratio; laminating the active layer onto a conductive substrate; forming one or more grooves in the active layer exposing a bare surface of the conductive substrate; and pressing the one or more Li strips into the one or more grooves, wherein widths of the one or more grooves are slightly larger than the widths of the Li strips.

15 Claims, 4 Drawing Sheets

(51) Int. Cl.
*H01G 11/28* (2013.01)
*H01G 11/06* (2013.01)
*H01G 11/86* (2013.01)
*H01G 11/26* (2013.01)
*H01M 4/62* (2006.01)
*H01G 11/24* (2013.01)
*H01M 10/052* (2010.01)
*H01M 4/02* (2006.01)

(52) U.S. Cl.
CPC .... *H01M 10/052* (2013.01); *H01M 2004/027* (2013.01); *Y02E 60/13* (2013.01)

(56) References Cited

U.S. PATENT DOCUMENTS

| | | | | |
|---|---|---|---|---|
| 2006/0093872 A1* | 5/2006 | Howard | ................. | A61N 1/378 429/9 |
| 2006/0093916 A1* | 5/2006 | Howard | ................. | A61N 1/08 429/231.95 |
| 2006/0093918 A1* | 5/2006 | Howard | ................. | H01M 4/131 429/231.95 |
| 2007/0281210 A1* | 12/2007 | Kolosnitsyn | .......... | H01M 4/136 429/218.1 |
| 2007/0281213 A1* | 12/2007 | Pyszczek | ................. | H01M 4/06 429/231.7 |
| 2012/0028137 A1* | 2/2012 | Chase | ................. | H01M 4/382 429/405 |
| 2012/0064400 A1* | 3/2012 | Takada | ................. | H01M 4/136 429/209 |
| 2012/0107680 A1* | 5/2012 | Amiruddin | .......... | H01M 4/386 429/206 |
| 2015/0213967 A1* | 7/2015 | Yokouchi | .............. | H01M 4/661 429/211 |

FOREIGN PATENT DOCUMENTS

JP 2009187751 A * 8/2009
JP 2009295400 A * 12/2009

OTHER PUBLICATIONS

Suzuki, Yasuo, Machine Translation of JP-2009295400-A, Dec. 2009 (Year: 2009).*

* cited by examiner

LITHIUM ATTACHED ELECTRODES AND METHOD OF MAKING SAME

CROSS-REFERENCE TO RELATED APPLICATIONS

This application claims the benefit of U.S. Provisional Application No. 62/359,031, filed Jul. 6, 2016, the disclosure of which is incorporated herein in its entirety by reference.

BACKGROUND

1. Technical Field

Apparatuses and methods consistent with the present inventive concept relate to energy storage devices, and more particularly to electrodes for energy storage devices.

2. Related Art

Lithium (Li) doped negative electrodes are widely used in energy storage devices, for example, lithium-ion (Li-ion) batteries and Li-ion capacitors.

In the external Li attachment and pre-dope method, an electrode pack is constructed with at least one positive electrode, at least one separator, at least one Li film laminated on a current collector, and at least one negative electrode. The negative electrode is connected to the Li film electrode through the current collector tab. The electrode pack is immersed in electrolyte that contains Li ions. Through the pre-dope process, the Li film is converted into Li ions through the electrode and the Li ions migrate and are doped into the negative electrode.

Production of Li doped negative electrodes requires precise control of the amount of Li attaching to the negative electrode. A low amount of attached Li results in incomplete doping of the negative electrode causing sub-optimal electrode performance. On the other hand, over attaching Li to the negative electrode causes metal Li residue on the negative electrode after the pre-dope process that may cause safety issues for energy storage devices that include the electrodes.

In the external Li attachment and pre-dope method, thin Li metal films are normally provided only on the uppermost and lowermost layers of an electrode package. During the Li pre-dope process, the Li ions may be non-uniformly doped into the stacked negative electrode, and the Li metal films may remain on the electrode package after completion of the pre-doping process. More than twenty days are typically required to uniformly dope lithium to the negative electrode inside the electrode laminates.

In order to improve upon the long manufacture time necessary for the external Li attachment and pre-dope method, direct contact methods were proposed by different inventors. In the direct contact methods, Li powder or Li film were pressed directly onto the electrode surface layer. The direct contact methods shortened the Li pre-dope time. However, instantaneous electrical shorting between the Li metal and the negative electrode active layer materials (i.e., the surface of the electrode) induced by immersing the electrode pack into electrolyte caused severe reactions. These severe reactions resulted in damage to the electrode and separator.

SUMMARY

Various embodiments provide Li attached electrodes and methods for fabricating internal Li attached electrodes are provided.

According to various embodiments there is provided a method for fabricating an electrode. In some embodiments, the method may include: determining an electrode active layer thickness; selecting lithium (Li) pieces or strips having a specified thickness equal or slightly larger than the electrode active layer thickness; determining Li piece sizes or Li strip widths based on the active layer to Li layer weight or volume ratio requirements; coat or laminate the active layer onto the conductive substrate which may or may not contain a conductive binder interlayer, the electrode surface contains at least one of the following or both: grooves and holes, where bare conductive substrate is exposed and no active layer materials or conductive binder interlayer in it, and the hole sizes are slightly larger than the sizes of the Li pieces or the groove widths are slightly larger than the widths of the Li strips, and press the Li pieces or strips into the holes or grooves of the electrode. The grooves may be located anywhere on the electrode, including at the end of the active layer.

According to various embodiments there is provided an electrode. In some embodiments, the electrode may include: a conductive substrate which may or may not contain a conductive binder interlayer; an active layer adhered to the conductive substrate, the electrode surface contains at least one of the following or both: grooves and holes, where bare conductive substrate is exposed and no active layer materials or conductive binder interlayer in it; and lithium (Li) pieces or strips disposed in the holes or the grooves of the active layer. The grooves may be located anywhere on the electrode, including at the end of the active layer.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Various embodiments provide a new non-direct contact method for producing Li attached electrodes. The new non-direct contact method may reduce the long manufacture time used in the conventional external Li attachment and pre-dope method, and may prevent electrode and separator damage caused during the pre-dope process in the direct contact methods.

Figure 1A:
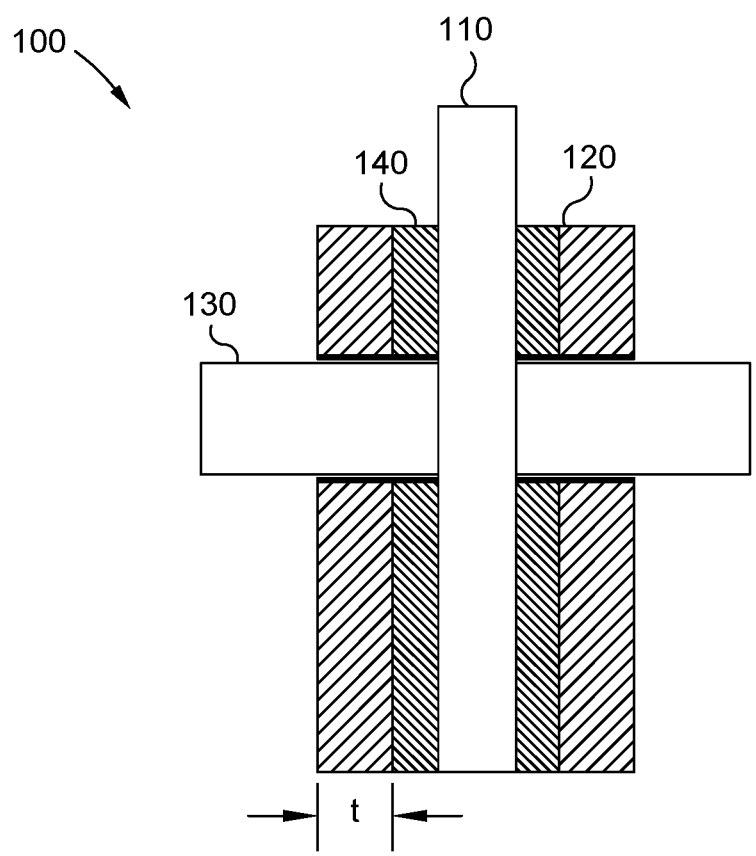
FIG. 1A is a diagram illustrating a view of a structure of an electrode according to various example embodiments.

Various embodiments provide electrodes having controlled electrode potentials for energy storage devices. In various embodiments, the electrodes may be configured with a controlled amount of attached lithium. The electrodes may be incorporated into energy storage devices, for example, but not limited to, lithium-ion batteries, lithium-ion capacitors, etc. FIG. 1A is a diagram illustrating a view of a structure of an electrode 100 according to various example embodiments. Referring to FIG. 1A, the electrode 100 may include a substrate 110 which may or may not contain include a conductive binder interlayer 140, an active layer 120 having a groove 150, and a lithium strip 130 disposed in the groove 150 of the active layer 120. In various example embodiments the substrate 110 may not include the conductive binder interlayer 140.

The substrate 110 may be an innermost layer of the electrode 100 and may be a conductive substrate formed from, for example, but not limited to, copper or other conductive material. A conductive binder interlayer 140 may or may not be added to the conductive substrate 110. The active layer 120 may be adhered to the substrate 110 or may be adhered to the conductive binder interlayer 140 when the conductive binder interlayer 140 is provided. A thickness t of the active layer 120 may be determined based on energy density and power density specifications for an energy storage device. The Li strip 130 may be formed from a Li sheet or other Li products, such as, but not limited to, foils, wires or melted powders.

Figure 1B:
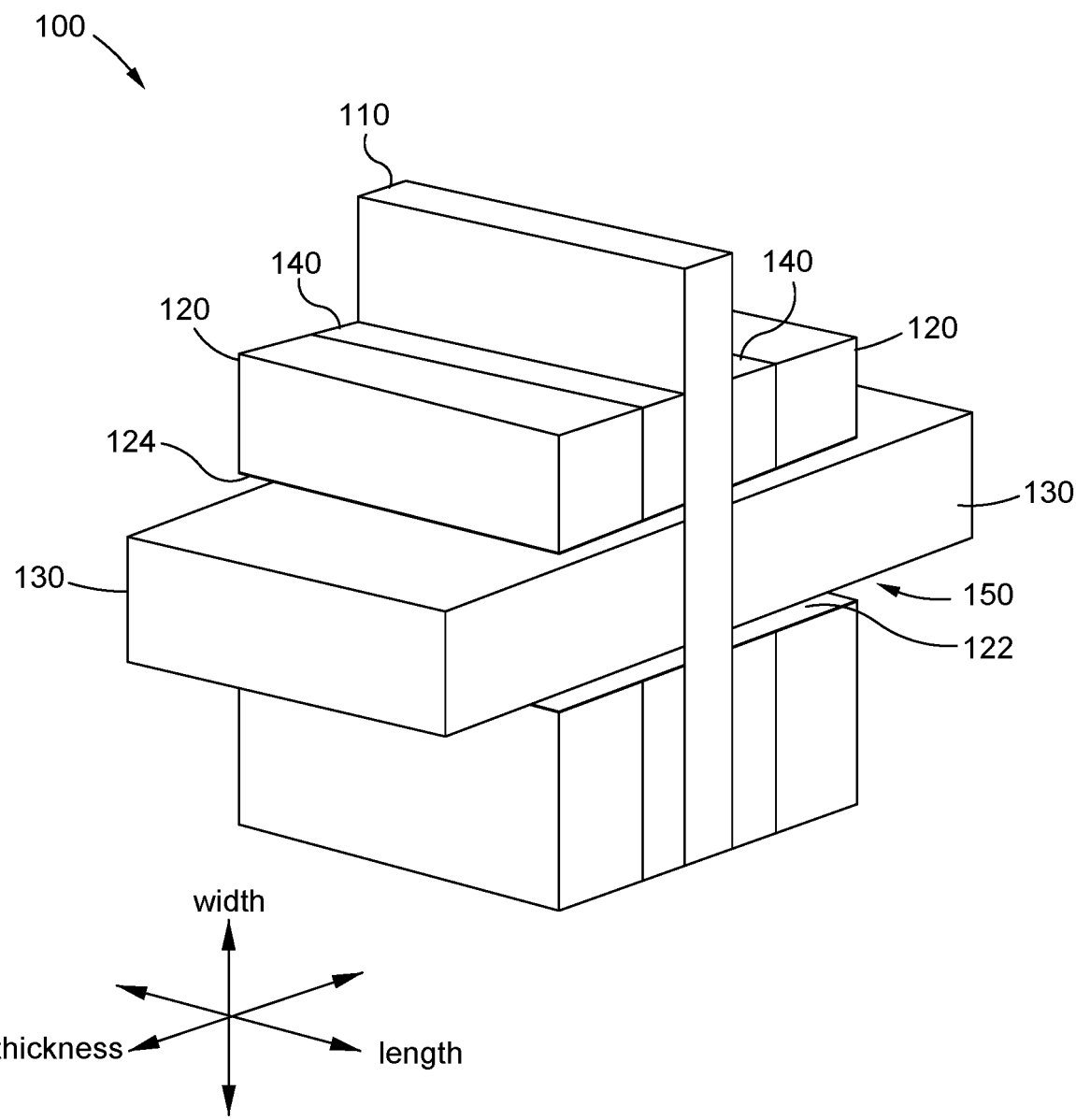
FIG. 1B is a diagram illustrating a view of the layers of an electrode according to various example embodiments.

FIG. 1B is a diagram illustrating a view of the layers of an electrode 100 according to various example embodiments. Referring to FIGS. 1A and 1B, the Li strip 130 may be adhered directly onto surface of the substrate 110 in the groove 150 formed by a top surface 122 of active layer 120 and a bottom surface 124 of active layer 120. As illustrated in FIGS. 1A and 1B, a similar groove 150 may be formed in the active layer 120 disposed on both sides of the substrate 110.

The Li strip 130 may not cover up to one hundred percent of the substrate 110 within the groove 150. The Li strip 130 may be constrained within the groove 150 on the top surface 122 of active layer 120 and the bottom surface 124 of active layer 120. The Li strip 130 may be equal to or thicker than the active layer 120. The groove 150 and the Li strip 130 may be located anywhere along the substrate 110 of the electrode 100, including at either or both ends of the active layer 120. Length, width, and thickness reference directions for the various layers are illustrated in FIG. 1B.

While the groove 150 illustrated in FIG. 1B is shown as a rectangular groove, one of ordinary skill in the art will appreciate that the groove may have other shapes enabling the Li strip 130 to be adhered directly onto the surface of the substrate 110 without departing from the scope of the present inventive concept. Alternatively or additionally, one or more discrete holes may be formed in the active layer to accommodate discrete Li pieces such that the Li pieces may be adhered directly onto surface of the substrate 110. Similar holes may be formed in the active layer 120 disposed on both sides of the substrate 110.

Figure 2A:
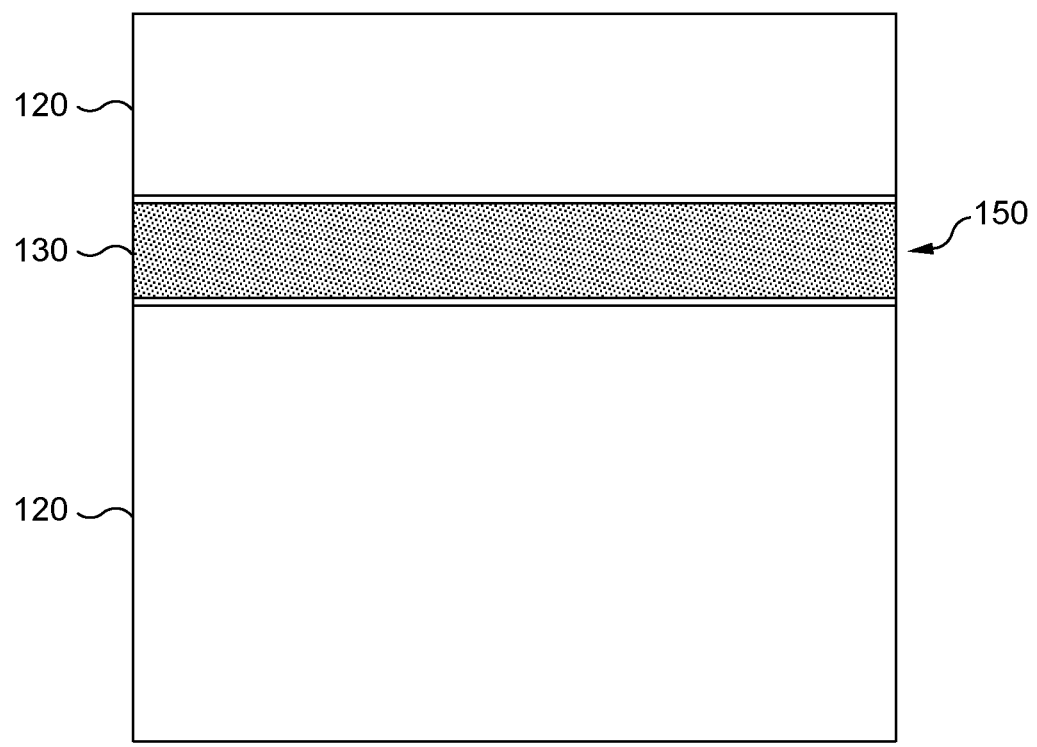
FIG. 2A is a diagram illustrating one Li strip disposed in one groove in the active layer on one of the two sides of an electrode 100 according to various example embodiments.
Figure 2B:
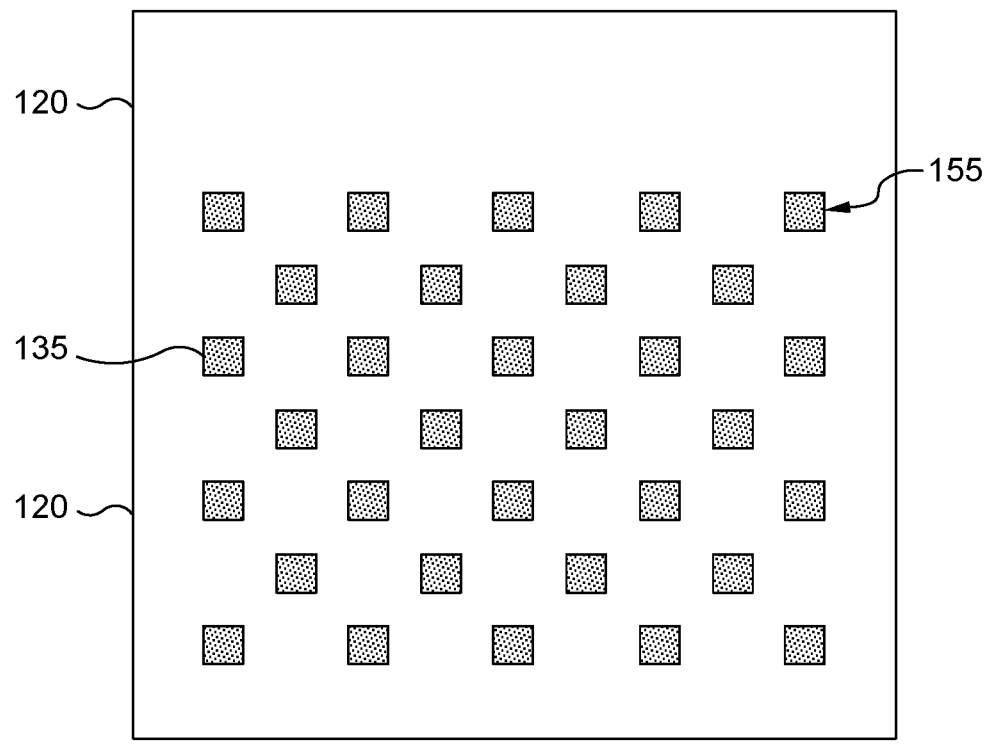
FIG. 2B is a diagram illustrating a plurality of lithium pieces disposed in a plurality of holes in the active layer on one of the two sides of an electrode according to various example embodiments.

FIG. 2A is a diagram illustrating one Li strip 130 disposed in one groove 150 in the active layer 120 on one of the two sides of an electrode 100 according to various example embodiments. FIG. 2B is a diagram illustrating a plurality of lithium pieces 135 disposed in a plurality of holes 155 in the active layer 120 on one of the two sides of an electrode 100 according to various example embodiments. One of ordinary skill in the art will appreciate that the Li strip 130 and pieces 135 as well as the groove 150 and holes 155 in the active layer 120 illustrated in FIGS. 2A and 2B are merely examples and that other shapes of Li strips, pieces, grooves, and holes may be used without departing from the scope of the present inventive concept. In various embodiments, shapes of the Li metal may be, for example, but not limited to, discrete Li dots, squares, or circles, Li strips, Li wires, etc. The shapes and number of Li pieces or strips forming the Li metal patterns are determined by minimizing the Li diffusion time from the Li strips 130 or pieces 135 to the furthest area of the active layer 120 balanced by manufacturing considerations, for example, but not limited to, fabrication and placement of the Li strips 130 or pieces 135.

When fabricating an electrode 100, the electrode parameters, such as the thickness t of the active layer 120 and the weight or volume ratio of the active layer 120 to the Li metal, may be specified based on energy density and power density requirements of the electrode 100. Knowing the density of the active layer 120 in the electrode 100 and the density of the Li metal, by selecting a commercially available Li foil with specific thickness, one can calculate the size of the Li pieces 135 and thus the hole 155 pattern and sizes in the active layer 120, or the Li strip 130 widths and thus the groove 150 widths in the active layer 120.

Table 1 lists an example of a width calculation for a Li strip 130. The width calculation assumes that there is one Li strip 130 and one groove 150 in each active layer 120 and that the length of the Li strip 130 is equal to the length of the active layer 120. Length, width, and thickness reference directions for the various layers are illustrated in FIG. 1B.

| Requirement | Value |
| --- | --- |
| Weight ratio of active layer to Li layer (WR) | 10:1 |
| Active layer thickness ($t_a$) | 100 μm |
| Density of active material ($D_a$) | 1.08 g/cm$^3$ |
| Density of Li ($D_{Li}$) | 0.543 g/cm$^3$ |
| Li strip thickness ($t_{Li}$) | 100 μm |
| Li strip width (G) | 16.59 mm |

In Table 1, the thickness t of the active layer 120 and the weight ratio of active layer 120 to the Li strip 130 (or lithium pieces 135) may be specified design parameters, a commercially available Li foil having a specified thickness may be selected, the densities of the active material and Li are known based on the materials, and the weight of the active layer 120 and Li weight may be calculated based on the densities and thus, the width of the Li strip 130 may be calculated. An electrode 100 having a groove 150 in the active layer 120 may be fabricated with the width of the groove 150 being slightly larger than the width of the Li strip 130.

The width of the groove 150 should be made minimal to reduce the material cost and to improve the electrode efficiency but large enough to prevent direct contact of the Li metal to the electrode active layer materials. For example, the width of the groove 150 may be about 0.5 mm larger than the width of the Li strip 130 creating a small gap between the Li strip 130 and the active layer 120. Similarly, the sizes of the holes may be about 0.5 mm larger than the sizes of the Li pieces 135 creating a small gap between the Li pieces and the active layer 120. Control of the gap may be achieved by calculations of the Li metal extension during the Li press process (i.e., final Li width) vs. groove width or hole sizes.

Based on the weight ratio (WR) of active layer to Li strip, and the densities and weights of the active layer 120 and Li strip 130, and the thicknesses of both the Li strip 130 and the active layer 120, the width G of the Li strip 130 may be calculated by Equation (1):

$$G = \frac{100(t_a)(D_a)}{t_{Li}(D_{Li})(WR) + t_a(D_a)} = \qquad (1)$$

$$\frac{100(100 \ \mu m)\left(1.08 \frac{g}{cm^3}\right)}{100 \ \mu m\left(.543 \frac{g}{cm^3}\right)(10) + 100 \ \mu m\left(1.08 \frac{g}{cm^3}\right)} = 16.59 \ mm$$

Thus, in the example above, assuming the Li strip 130 and the active layer 120 both have a thickness of 100 microns (μm), an electrode 100 with a groove 150 in the active layer 120 with a groove width slightly larger than 16.59 mm may be fabricated. The width of the groove 150 should be made minimal to reduce the material cost and to improve the efficiency of the electrode 100 but large enough to prevent the direct contact of the Li metal to the electrode active layer materials.

Embodiments of the present inventive concept provide methods for fabricating electrodes using various commercially available freestanding Li foils or wires. In the various example embodiments, by specifying the Li foil thickness and applying the Li foil pieces or strips 130 to the conductive substrate 110 inside the groove 150 in the active layer 120, an electrode 100 having specified energy density and power density requirements may be fabricated.

Referring again to Table 1, by selecting a Li foil with a commercially available thickness (e.g., 150 μm), the width of the Li strip 130 may be recalculated as necessary, as shown in Equation (2):

$$G = \frac{100(100 \ \mu m)\left(1.08 \frac{g}{cm^3}\right)}{150 \ \mu m\left(.543 \frac{g}{cm^3}\right)(10) + 100 \ \mu m\left(1.08 \frac{g}{cm^3}\right)} = 11.71 \ mm \qquad (2)$$

Thus, using an available Li foil thickness of 150 μm, an electrode 100 meeting specified energy density and power density requirements with an 11.71 mm wide Li strip 130 disposed in a groove 150 in the active layer 120 on top of the conductive substrate 110 may be fabricated.

One of ordinary skill in the art will appreciate that more than one Li strip 130 or more than one groove 150 in the electrode active layer 120, or other shapes of Li products, such as, for example, but not limited to, discrete Li dots, squares, or circles, Li wires, etc., may be used without departing from the scope of the present inventive concept. One of ordinary skill in the art will also understand that similar calculations may be performed for different shapes of Li products.

Increasing the number of Li strips 130 or grooves 150 in the electrode active layers 120, or using other shapes of the Li format, may reduce the Li diffusion time from the Li strips 130 or pieces 135 during Li doping process, however, it may increase the manufacture difficulties. Therefore, the shapes and number of Li strips 130 or pieces 135 forming the Li layer patterns should be determined by minimizing the Li diffusion time from the Li strips 130 or pieces 135 to the furthest area of the active layer 120 but be balanced by the ease of manufacturing considerations, for example, but not limited to, fabrication and placement of the Li strips 130 or pieces 135.

In various embodiments, the Li foil thickness may be equal to or less than double (i.e., two times) the thickness of the active layer 120. A Li foil thickness greater than double the thickness of the active layer 120 may result in a long Li pre-dope process due to a smaller contact area between the Li strips 130 and the conductive substrate 110, and/or portions of the Li foil forming the Li layer pattern may protrude from the surface of the active layer 120 and pierce the separator causing shorts between the electrodes. An Li foil thickness less than the thickness of the active layer 120 may result in loose contact between the Li layer and the conductive substrate 110, or the width of the groove 150 or sizes of the holes 155 are too large such that the electrode pack made by the negative electrode may have low efficiency.

FIGS. 2A and 2B are diagrams illustrating Li strips and pieces, respectively, placed inside the active layer groove or holes, respectively, according to various example embodiments. FIG. 2A illustrates one surface (e.g., the top surface 122 or the bottom surface 124) of an active layer (e.g., the active layer 120) of an electrode (e.g., the electrode 100). Referring to FIGS. 1A-2B, an electrode 100 may include an active layer 120 including a groove 150 disposed on a substrate (e.g., substrate 110) or conductive binder layer (e.g., interlayer 140). Li strips 130 or pieces 135 may be disposed on the substrate 110 and in the groove 150 in the active layer 120. The width of the Li strip 130 or piece 135 sizes may be smaller than the width of the groove 150. The thickness of the Li strip 130 or pieces 135 may be equal to or may exceed the thickness of the active layer 120, but should not be more than double (i.e., two times) the thickness of the active layer 120. The thickness of the Li strips 130 or pieces 135 may not be thinner than the thickness of the active layer 120.

Figure 3:
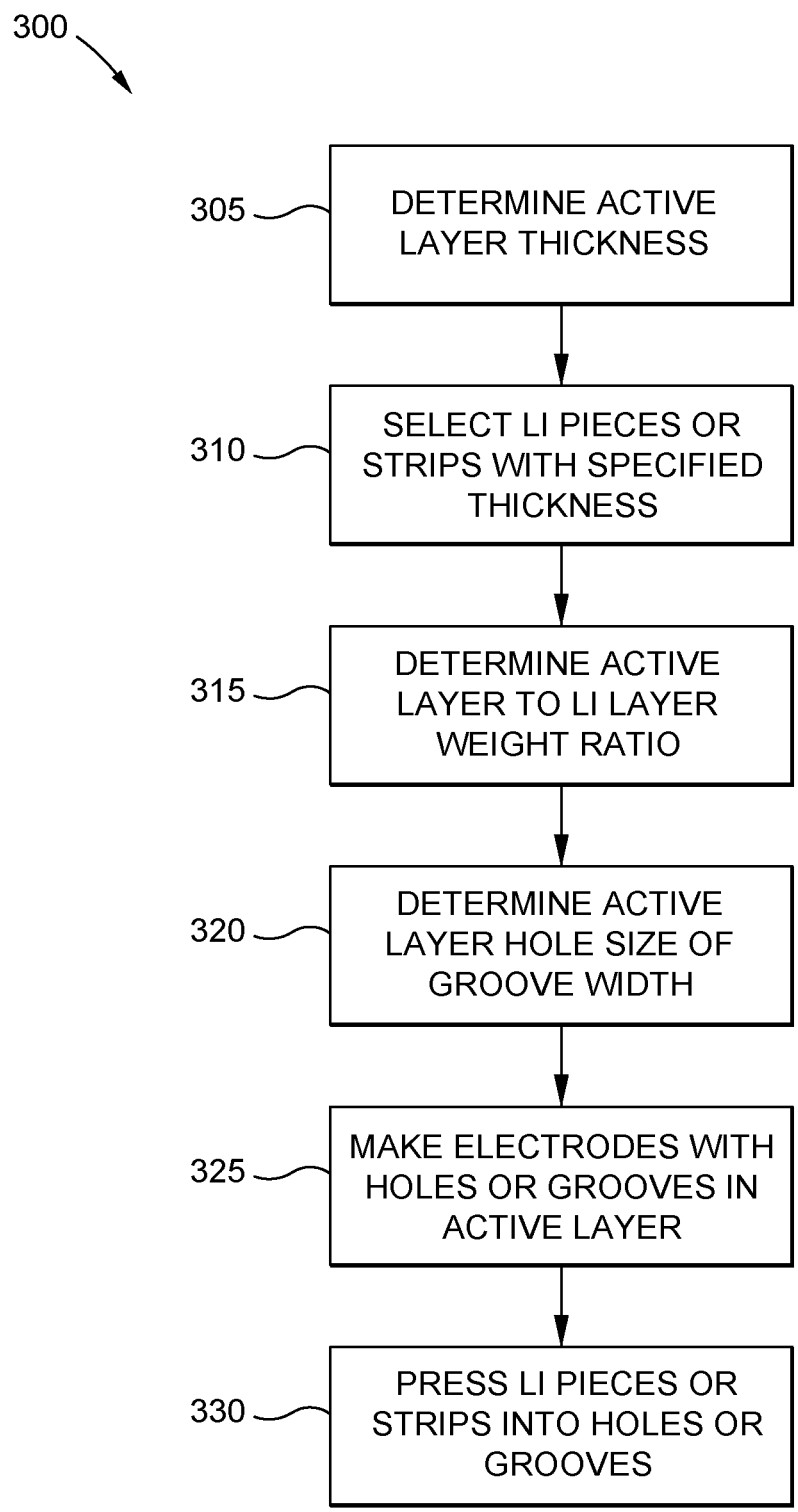
FIG. 3 is a flowchart illustrating a method for fabricating an electrode according to various example embodiments.

FIG. 3 is a flowchart for a method 300 for fabricating Li electrodes according to various example embodiments. Referring to FIG. 3, at block 305, a thickness of an electrode active layer 120 may be determined based on energy density and power density specifications of an energy storage device. The electrode active layer 120 may be a film layer formed with a combination of, for example, but not limited to, active materials (e.g., graphite, hard carbon, soft carbon, activated carbon, Lithium salts, Li oxides, silicon, etc.), conductive carbon, and binder.

At block 310, a thickness of the Li pieces or strips 130 or pieces 135 may be selected. For example, the Li thickness may be selected based on, for example, but not limited to, commercial availability, ability to handle the Li without damage, etc. The Li thickness may be at least equal to or greater than the thickness of the active layer 120. At block 315, a weight ratio of the active layer 120 to the Li layer may be determined. An electrode potential after pre-doping may be made as close as possible to a Li metal potential by maximizing the Li effects by use maximum amount of Li strips 130 or pieces 135. However, the amount of Li strips 130 or pieces 135 may be optimized to minimize Li metal residue upon completion of a pre-doping process. For example, the weight ratio of the active layer 120 to the Li layer may be in a range of 5:1 to 15:1.

At block 320, the pattern for the groove or grooves 150 or holes 155 in the active layer 120 may be determined. The selection of the pattern for the groove or grooves 150 or holes 155 will be considered with both Li strips 130 or pieces 135 placement uniformity and dispersion, and ease of manufacture conditions, for example, but not limited to, fabrication and placement of the Li strips 130 or pieces 135. The widths of the groove or grooves 150 or sizes of the holes 155 may also be determined. For example, width of the groove 150 in the active layer 120 may be determined by the width of the Li strip 130 which may be calculated by Equations (1) and (2). The width of the groove 150 should be larger than the width of the Li strip 130. Similarly, the sizes of the holes 155 should be made larger than the sizes of the Li pieces 135.

The width of the groove 150 or sizes of the holes 155 should be made minimal to reduce the material cost and to improve the efficiency of the electrode 100 but large enough to prevent the direct contact of the Li metal to the electrode active layer materials. For example, the width of the groove 150 may be about 0.5 mm larger than the width of the Li strip 130 creating a small gap between the Li strip 130 and the active layer 120. Similarly, the sizes of the holes may be about 0.5 mm larger than the sizes of the Li pieces 135 creating a small gap between the Li pieces and the active layer 120. Control of the gap may be achieved by calculations of the Li metal extension during the Li press process (i.e., final Li width) vs. groove width or hole size.

At block 325, the electrode 100 with the grooves 150 or holes 155 in the active layer 120 may be fabricated. The electrode 100 may include the conductive substrate 110, may or may not include the conductive binder interlayer 140, and may include the active layer 120 with the grooves 150 or holes 155.

At block 330, the Li strips 130 or pieces 135 may be arranged in groove or grooves 150 or holes 155, respectively, in the active layer 120 on top of the conductive substrate 110 such that the diffusion time between the Li strips 130 or pieces 135 and the active layer 120 is minimized. Further, the Li strips 130 or pieces 135 (e.g., Li dots, Li squares, Li stripes, etc.) and the groove or grooves 150 or holes 155 in the active layer 120 that minimizes the Li diffusion distance from the Li layer (i.e., the Li strips 130 or pieces 135 and the active layer 120 is minimized. Further, the Li strips 130 or pieces 135) to the active layer 120 may be determined at least in part based on manufacturing considerations, for example, but not limited to, fabrication and placement of the Li strips 130 or pieces 135. The grooves 150 or holes 155 may be located anywhere on the electrode 100, including at the either or both ends of the active layer 120.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A lithium (Li) attached electrode, comprising:
a conductive substrate;
an active layer disposed on the conductive substrate;
one or more grooves formed in the active layer exposing a bare surface of the conductive substrate; and
one or more Li strips disposed in the one or more grooves on the exposed bare surface of the conductive substrate, wherein the thickness of the one or more Li strips is greater than the thickness of the active layer such that the one or more Li strips protrude from the one or more grooves,
wherein the one or more Li strips have a length approximately equal to a length of the active layer.

2. The electrode of claim 1, wherein the one or more grooves in the active layer are disposed at various positions on the electrode including at an end of the active layer.

3. The electrode of claim 1, wherein the thickness of the one or more Li strips is equal to or less than double the thickness of the active layer.

4. The electrode of claim 1, wherein the one or more Li strips are oriented parallel to a length of the active layer.

5. The electrode of claim 1, wherein a weight ratio of the active layer to the one or more Li strips is in a range of 5:1 to 15:1.

6. The electrode of claim 1, further comprising:
a conductive binder layer laminated onto the conductive substrate prior to laminating the active layer,
wherein the one or more grooves are formed in the active layer and the conductive binder layer exposing the bare surface of the conductive substrate.

7. A method for fabricating an electrode, the method comprising:
determining a thickness of an active layer;
selecting lithium (Li) foil having a specified thickness;
determining lengths of one or more Li stripes based on a length of the active layer;
calculating width of the one or more Li strips from an active layer to Li layer weight ratio or volume ratio;
laminating the active layer onto a conductive substrate;
forming one or more grooves in the active layer exposing a bare surface of the conductive substrate; and
pressing the one or more Li strips having the determined lengths and calculated widths into the grooves such that the one or more Li strips protrudes from the one or more grooves.

8. The method of claim 7, wherein the one or more grooves in the active layer are disposed at various positions on the electrode including at an end of the active layer.

9. The method of claim 7, wherein the specified thickness of the Li foil is at least equal to or greater than the thickness of the active layer.

10. The method of claim 1, wherein the lengths of the one or more Li strips have are approximately equal to the length of the active layer.

11. The method of claim 1, wherein the one or more Li strips are oriented parallel to the length of the active layer.

12. The method of claim 7, wherein said active layer to Li layer weight ratio or volume ratio comprises a weight ratio in a range of 5:1 to 15:1.

13. The method of claim 7, further comprising:
laminating a conductive binder layer onto the conductive substrate prior to laminating the active layer, and
wherein the forming one or more grooves comprises forming one or more grooves in the active layer and the conductive binder layer exposing the bare surface of the conductive substrate.

14. The method of claim 9, wherein the specified thickness of the Li foil is equal to or less than double the thickness of the active layer.

15. The method of claim 14, wherein the specified thickness of the Li foil is greater than the thickness of the active layer.

* * * * *